UNITED STATES PATENT OFFICE.

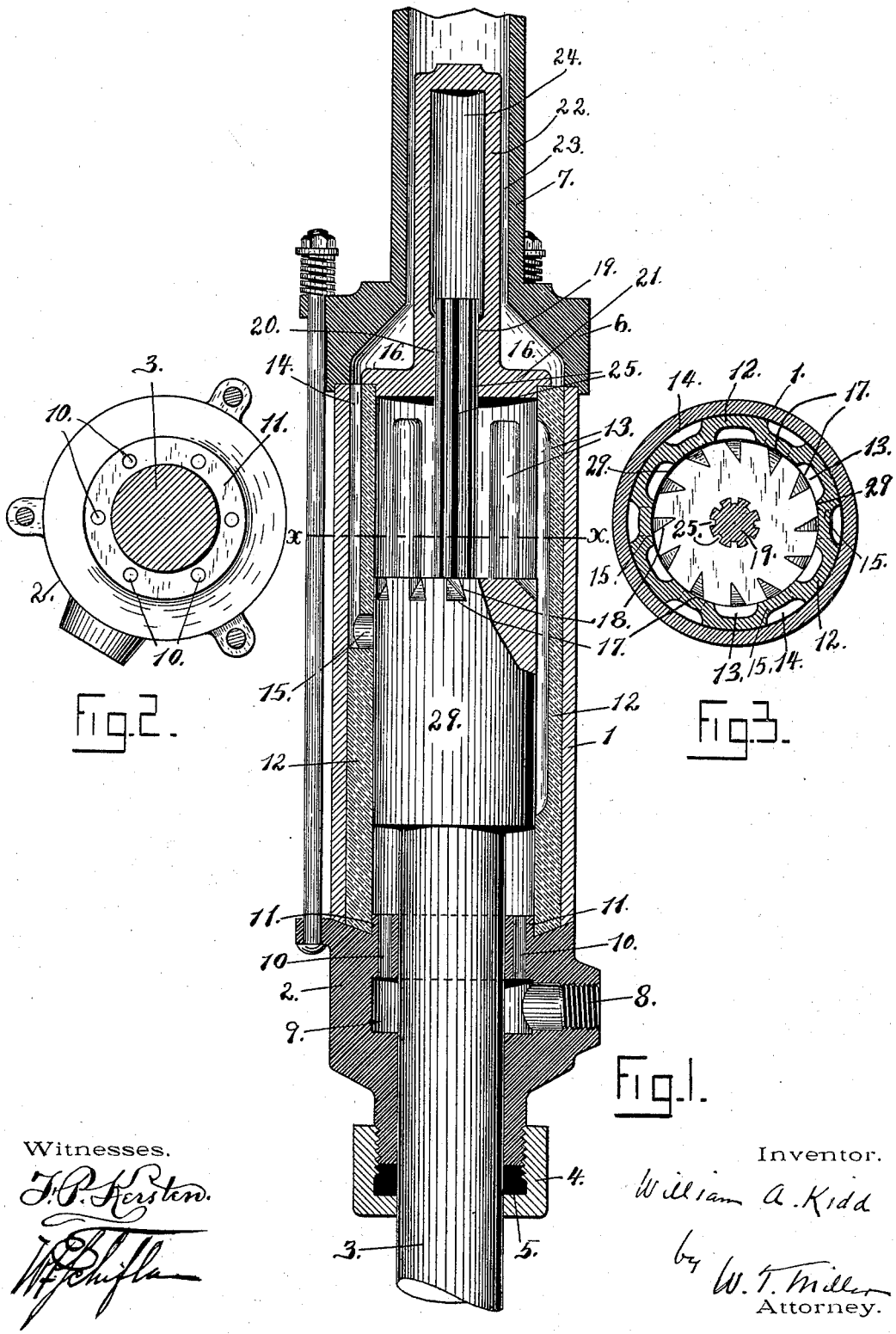

WILLIAM A. KIDD, OF BUFFALO, NEW YORK.

DIRECT-ACTING ENGINE.

SPECIFICATION forming part of Letters Patent No. 585,960, dated July 6, 1897.

Application filed September 16, 1896. Serial No. 606,007. (No model.)

*To all whom it may concern:*

Be it known that I, WILLIAM A. KIDD, a citizen of the United States, residing at Buffalo, in the county of Erie and State of New York, have invented certain new and useful Improvements in Direct-Acting Engines; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in the arrangement and construction of cylinders and their pistons of direct-acting engines specially adapted for use in connection with rock-drills and steam-hammers or any machinery driven by steam or compressed air which is subjected to severe shocks or which require action with the least possible resistance and wear to the working parts.

The particular type of piston and cylinder to which my improvements appertain consists of a piston having a narrow annular shoulder at the piston-rod end, a cylinder of uniform interior dimensions throughout its length having an inlet-passage at one end for the admission of steam under pressure or compressed air into the cylinder and against the annular shoulder for forcing the piston forward, an exhaust-passage leading therefrom which is alternately opened and closed by the piston in its travel, and a passage in the side wall of the cylinder opening at both ends into the cylinder for conducting the steam under pressure or the compressed air to the cylinder-space in front of the piston to cause the forward stroke, the piston in its travel alternately opening and closing the ends of the passage in the side wall of the cylinder.

The objects of my present invention in connection with cylinders and pistons of the above-outlined type are, first, the production of a cylinder which will be entirely free from projections or depressions upon its outer surface in order to obtain a perfectly uniform expansion, so that the bore of the cylinder will not be injuriously affected by any twisting or springing action due to unequal expansion or contraction of the wall of the cylinder under varying degrees of heat, which often causes an uneven working of the piston and not infrequently a cracking of the cylinder; second, the intermittent rotation of the piston, as is necessary in some direct-acting engines, (notably in rock-drills,) without necessitating the employment of a twisted rifled bar fitted into the head of the piston, which, with its numerous operative attachments, requires considerable power to operate, and, third, a more compact arrangement of steam parts and passages within the cylinder for reciprocating and rotating the piston and exhausting the steam after it has performed its work.

To these ends my invention consists, first, of an improved form of cylinder and piston for steam or compressed-air engines consisting, essentially, of a piston having an annular shoulder at the piston-rod end, a cylinder with unobstructed outer surface throughout its length, a cylindrical bushing in tight contact with the inner wall of the cylinder and within which the piston travels, the inner surface of the bushing being provided with a series of longitudinal grooves or depressions which form passages with the side surface of the piston for conducting the steam or compressed air around the same, the outer surface of the bushing having a series of longitudinal grooves or depressions which form passages with the inner wall of the cylinder for exhausting the steam or compressed air through one end thereof, its other end being provided with an inlet-passage for the steam or compressed air; second, in connection with a cylinder and its grooved bushing, as above outlined, a piston having an annular shoulder at its piston-rod end, its other end being provided with a series of radial inclined notches or pockets, against which the steam impinges in its passage around the piston to impart to the same an intermittent rotary movement, and, third, in other details of construction, all of which will be more fully hereinafter described and claimed.

In the drawings, Figure 1 is a central longitudinal section of my improved cylinder and piston. Fig. 2 is a plan view of the inner face of the seat, and Fig. 3 is a section taken in the line $x\ x$ of Fig. 1.

Referring to the drawings, 1 is the outer cylindrical shell of the cylinder, its outer wall being entirely unobstructed throughout its length, as shown. The forward end of this cylinder is tightly fitted within the annular seat 2, through which the piston-rod 3 is reciprocated, the outer end of this seat 2 being made steam-tight by the screw-threaded cap 4 and packing-ring 5, of ordinary construction. The rear end of the cylinder 1 is tightly fitted in the cap 6, which has a central tubular extension 7. This cap 6 and the seat 2 are to be removably secured together in any well-known manner, as with tie-rods or otherwise.

8 is the inlet-passage opening into the annular chamber 9 in the seat 2. This chamber communicates with the interior of the cylinder through the passages 10 in the annular shoulder 11, which limits the forward stroke of the piston 3. A cylindrical bushing 12 is tightly fitted within the cylinder 1 and extends its entire length. Around its inner surface are arranged a series (preferably six) of grooves or depressions 13, which extend from a point near the rear end of the cylinder toward the apertured shoulder 10 11 for about three-quarters of the distance, as shown in Fig. 1. Upon the outer surface of the bushing 12 are arranged another series of grooves or depressions 14, which extend from the rear end of the bushing to a point about midway of its length, their inner ends communicating with the cylinder-space through apertures 15 and their rear or outer ends opening into the annular space 16 within the cap 6. These grooves 14 form passages in connection with the inner wall of the cylinder 1 for exhausting the steam, as will more fully hereinafter appear. The rear end surface of the piston 29 is provided with a series of radial notches or pockets 17, having inclined sides 18, which make the floors of these notches or pockets about double the width of the upper radial openings. The end openings of these notches or pockets have by reason of their construction the form of a trapezoid. Extending centrally from the rear end of the piston 29 and in line with the piston-rod 3 is the small cylindrical guide-rod 19, which reciprocates loosely through the socket 20 in the head 21, tightly secured to the rear end of the bushing 12. The rear end of this head 21 has the cylindrical extension 22 projecting into the tubular extensions 7 and of smaller diameter, thus forming the annular exhaust-space 23. Within the extension 22 is the elongated cylindrical chamber 24, with closed rear end. This chamber is adapted for the reception of the guide-rod 19 during the back stroke of the piston. A series of longitudinal grooves 25 around the surface of the guide-rod 19 permit of the escape of any steam which may have been forced into the chamber 24 and also prevents the formation of a vacuum therein.

In operation it will be seen that in the drawings the piston is about midway of its travel. The steam under boiler-pressure or the compressed air is admitted to the annular space behind the piston and exerting pressure against the annular shoulder of the piston forces it forward in the cylinder, shutting the exhaust-ports 15 in its return travel and opening the forward ends of the grooves or passages 13 just as it completes its return stroke. This permits the steam under boiler-pressure or the compressed air from the annular cylinder-space to be forced through the grooves or passages 13 and admitted to the cylinder through the rear ends of these grooves or passages just as the piston starts back on its forward stroke.

The forward stroke of the piston is made against the steam under boiler-pressure or the compressed air in the annular cylinder-space at the other end, which is provided with no exhaust-port, but this is effected by the expansion of the steam or compressed air exerted against practically the entire end area of the piston as against the back pressure exerted upon the narrow annular shoulder upon the other end of the piston. In this manner the piston is forced ahead upon its return stroke until the exhaust-ports 15 are passed, which releases the pressure and permits the piston to commence its next return stroke, as already described. As the steam or compressed air passes around the piston through the grooves 13 its escape therefrom into the cylinder exerts a rotary pressure against the radial inclined notches or pockets 17 18 in the piston, thereby imparting to the piston 29 and its rod 3 an intermittent rotary movement, necessary in rock-drills.

It will be noticed on reference to the drawings that what engineers call "lap" on valves is very small in this case, say about one-half inch. Now this piston will run at one-half-an-inch stroke or at the full length of the cylinder, according to where the piston is stopped in its downward stroke, and by raising or lowering the cylinder the stroke can be varied from one-half inch to the whole length of the cylinder. The improved cylinder and piston, just described, for direct-acting engines belongs to the class called "valveless," which is well known; but I am not aware that any have been constructed with a bushing grooved or fluted inside and outside to form passages for distributing the steam or that the end of the piston has been provided with angular notches or pockets to intermittently rotate the piston.

I claim—

1. An improved form of cylinder and piston for steam or compressed-air engines consisting essentially of a piston having an annular shoulder at the piston-rod end, a cylinder with unobstructed outer surface throughout its length, a cylindrical bushing in tight contact with the inner wall of the cylinder and within which the piston travels, the inner surface of the bushing being provided with a series of longitudinal grooves or depressions which form passages with the side surface of the reciprocating piston for conducting the steam or compressed air around the same and inlet and exhaust passages all operating substantially as stated.

2. An improved form of cylinder and piston for steam or compressed-air engines consisting essentially of a piston having an annular shoulder at its piston-rod end, and a series of notches or pockets at its opposite end for the purpose stated, a cylinder with an unobstructed outer surface throughout its length, a cylindrical bushing in tight contact with the inner wall of the cylinder and within which the piston travels, the inner surface of the bushing being provided with a series of longitudinal grooves or depressions which form passages with the side surface of the reciprocating piston for conducting the steam or compressed air around the same and inlet and exhaust passages all operating substantially as stated.

3. An improved form of cylinder and piston for steam or compressed-air engines consisting essentially of a piston having an annular shoulder at the piston-rod end, a cylinder with unobstructed outer surface throughout its length, a cylindrical bushing in tight contact with the inner wall of the cylinder and within which the piston travels the inner surface of the bushing being provided with a series of longitudinal grooves or depressions which form passages with the side surface of the reciprocating piston for conducting the steam or compressed air around the same, the outer surface of the bushing having a series of longitudinal grooves or depressions communicating with the cylinder-space and which form passages with the inner wall of the cylinder for exhausting the steam or compressed air through one end thereof, the other end being provided with an inlet-passage all combined and operating substantially as stated.

4. An improved form of cylinder and piston for steam or compressed-air engines consisting of a piston having an annular shoulder at the piston-rod end and a series of notches or pockets at its opposite end for the purpose stated, a cylinder with unobstructed outer surface throughout its length, a cylindrical bushing in tight contact with the inner wall of the cylinder and within which the piston travels, the inner surface of the bushing being provided with a series of longitudinal grooves or depressions which form passages with the side surface of the reciprocating piston for conducting the steam or compressed air around the same, the outer surface of the bushing having a series of longitudinal grooves or depressions communicating with the cylinder-space and which form passages with the inner wall of the cylinder for exhausting the steam or compressed air through one end thereof, the other end being provided with an inlet-passage all combined and operating substantially as stated.

In testimony whereof I have signed my name to this specification in the presence of two subscribing witnesses.

WILLIAM A. KIDD.

Witnesses:
W. T. MILLER,
W. F. SCHIFLA.